United States Patent [19]
Anthony

[11] Patent Number: 5,560,792
[45] Date of Patent: Oct. 1, 1996

[54] DEVICE TO EQUALIZE THE PRESSURE IN TIRES

[76] Inventor: Edward Anthony, 3455 E. Maple, Flint, Mich. 48529

[21] Appl. No.: 377,125

[22] Filed: Jan. 23, 1995

[51] Int. Cl.[6] .................................................. B60C 23/00
[52] U.S. Cl. ............................................ 152/415; 137/224
[58] Field of Search ........................... 152/415; 137/225, 137/226, 227, 224

[56] References Cited

U.S. PATENT DOCUMENTS

| | | | |
|---|---|---|---|
| 3,037,544 | 6/1962 | Gouirand | 152/415 X |
| 3,468,162 | 9/1969 | Contri | 73/146.3 |

*Primary Examiner*—Michael W. Ball
*Assistant Examiner*—Francis J. Lorin
*Attorney, Agent, or Firm*—David H. T. Wayment

[57] ABSTRACT

The described device maintains an equal pressure in each associated tire as long as that pressure is above an adjustable, threshold amount and isolates the tires when the pressure attempts to go below the threshold. The apparatus comprises a body with ports (each communicating with a tire) having in series a conventional tire valve (each of which is actuated simultaneously by one pressure sensitive piston). One end of each of the conventional tire valves communicates with a chamber in the body that can be pressurized. The pressure sensitive piston comprises an adjustable spring outside of the chamber bearing on the piston through a flexible diaphragm such that the force produced by the pressure difference between inside and outside the chamber across the diaphragm acts with the force produced by the spring to cause the piston to open all of the conventional valves when the chamber pressure (which is also the tire pressure) exceeds a value and the piston to close all of the conventional valves when the chamber pressure is less than the value. The transition value of pressure may be set by adjusting the compression of the spring. In the preferred embodiment of the present invention, the axis of the conventional tire valves are parallel to the axis of the piston. In an alterative embodiment, the axis of the conventional tire valves are perpendicular to the axis of the piston.

20 Claims, 4 Drawing Sheets

DEVICE TO EQUALIZE THE PRESSURE IN TIRES

TECHNICAL FIELD OF THE INVENTION

The technical field of the present invention is that of vehicle mounted devices that communicate with two or more vehicle tires to effect air pressures in the tires that are essentially equal and to prevent a catastrophic failure of a tire to affect other tires adversely. The technical field also includes devices that facilitate pressurizing a set of tires through one port or monitoring the pressure through one port.

BACKGROUND INFORMATION

Consider the use of two or more tires mounted at each end of a vehicle's axle. This is a common procedure with vehicles carrying heavy loads in order to maintain road pressure below limits. Even if the pressure inside each tire is initially the same, there is a tendency for the inside pressures to diverge as the vehicle travels down the road. This occurs because one tire will effectively have somewhat more load than the others (perhaps because it is slightly larger or is less able to reject heat) resulting in it becoming hotter than the others, resulting in an internal pressure that is higher, resulting in it becoming a bit larger, resulting in it taking on somewhat more load, and so on until either an equilibrium is reached or the tire is destroyed. Even if equilibrium is achieved, the result is an uneven load distribution between the tires and unequal service lives. What is desired is for each tire to shoulder an essentially equal amount of the load. Assuming similar tires, this desired state occurs, or is close to occurring, when the inside pressures of the tires are equal.

One could run a conduit between the tires so that an increased pressure in one tire would cause air to flow into the other tires and inherently equalize all of their pressures while allowing the pressurization from an external source through a spur to the conduit. A similar device may be described in U.S. Pat. No. 3,302,682. Such a device causes all connected tires to go flat if one goes flat.

A number of devices have used a pressure sensitive means to interpose a single barrier between ports communicating with tires such that the tires are isolated when the pressure in one tire becomes less than a certain amount. Such isolating devices may be described in U.S. Pat. Nos. 3,468, 162, 3,760,859, 4,203,467, and 4,539,928. These devices tend to be complicated and expensive to construct. If the single pressure sensitive barrier fails, the entire system fails.

Accordingly, an object of the present invention is a relatively inexpensive, reliable device (using simple or conventional parts) that maintains an equal pressure in each tire as long as that pressure is above an adjustable, threshold amount and that isolates the tires when the pressure attempts to go below the threshold.

More particular objects of the present invention are/is a device that facilitates pressurizing the tires from one port, monitoring the pressure from one port, and a device such that the failure of one valve or diaphragm will not cause a catastrophic failure of the system.

SUMMARY OF THE INVENTION

The foregoing and other objects and advantages are achieved with the apparatus and process disclosed below. The apparatus comprises a body with ports (each communicating with a tire) having in series a conventional tire valve (each of which is actuated simultaneously by one pressure sensitive piston). There are as many conventional tire valves as there are tires. One end of each of the conventional tire valves communicates with a chamber in the body that can be pressurized. The pressure sensitive piston comprises an adjustable spring outside of the chamber bearing on the piston through a flexible diaphragm such that the force produced by the pressure difference between inside and outside the chamber across the diaphragm combines with the force produced by the spring to cause the piston to open all of the conventional valves when the chamber pressure (which is also the tire pressure) exceeds a value and to cause the piston to close all of the conventional valves when the chamber pressure is less than the value. The transition value of pressure may be set by adjusting the compression of the spring. In the preferred embodiment of the present invention, the axis of the conventional tire valves are essentially parallel to the axis of the piston. In an alterative embodiment, the axis of the conventional tire valves are essentially perpendicular to the axis of the piston. In the later case, the end of the pressure sensitive piston bearing on the valve's actuators effects a camming action. Clearly, the present invention encompasses valves having any orientation to the movement direction of the pressure sensitive piston. The conventional tire valves are sometimes referred to as schrader valves, have actuator stems extending from each end, are reliable, and are inexpensive.

When the pressure in the chamber exceeds a threshold value, the piston is in a position to open all of the conventional valves allowing communication between the tires and, in turn, causing the pressures in all of the tires to be equal and the same as the pressure in the chamber. When the pressure in the chamber is below the threshold value, the piston moves away from the actuator stems of the conventional valves causing them to close and isolate the tires from each other. The latter situation is most likely to occur because of a slow or fast leak in a tire. The isolation insures that such a leaky tire can only reduce the pressure in the other tires to the threshold value. If the diaphragm should rupture, the piston will close the conventional valves and the system will be no worse off then without the device. If the conventional valve associated with a low pressure (or flat) tire should stick open when the piston moves away from its stem, the tires will still be isolated by the other valves.

DETAILED DESCRIPTION OF THE INVENTION AND ITS PREFERRED EMBODIMENT

Figure 1:
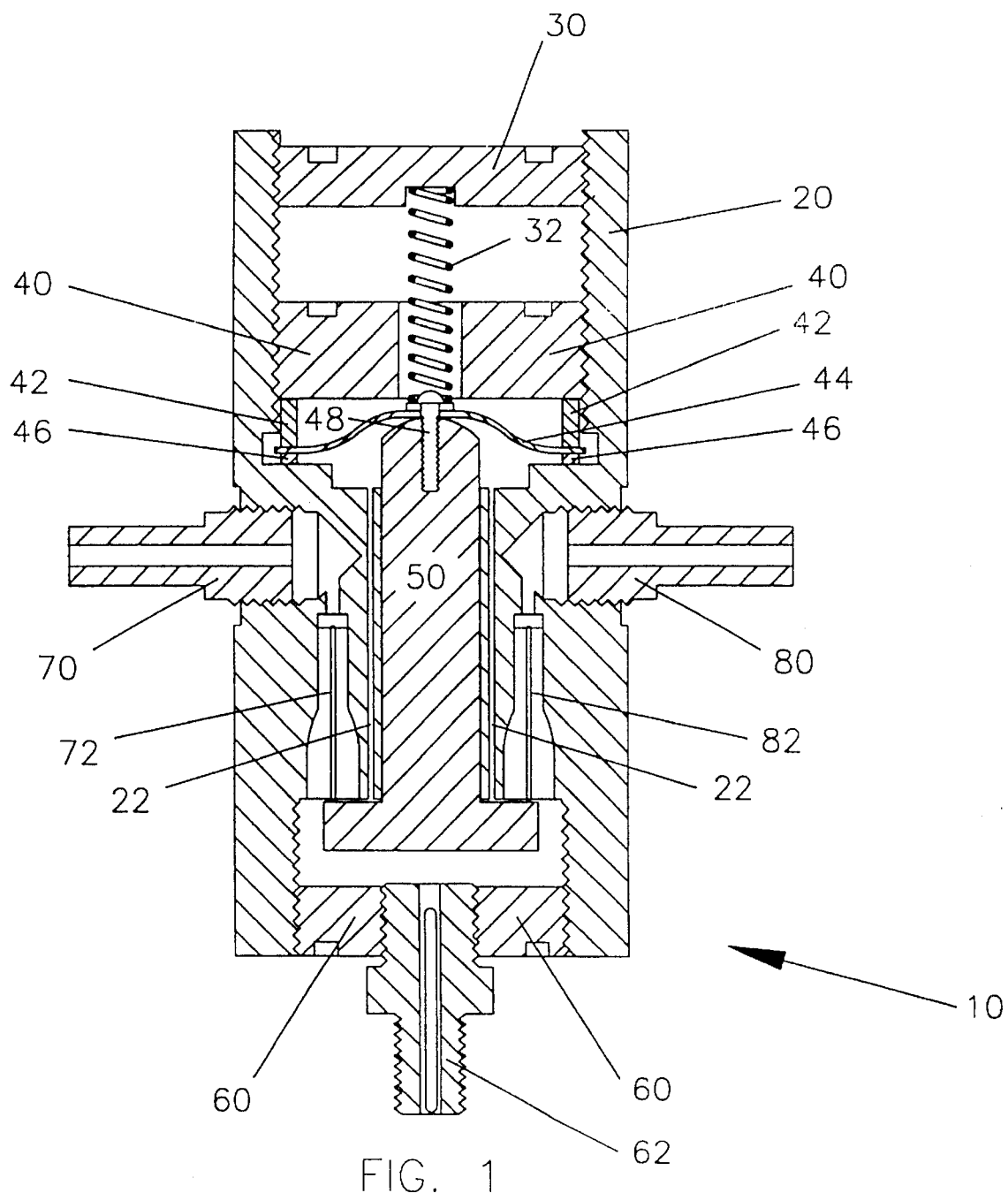
FIG. 1 is a cross section view of the preferred embodiment with the valves open.
Figure 2:
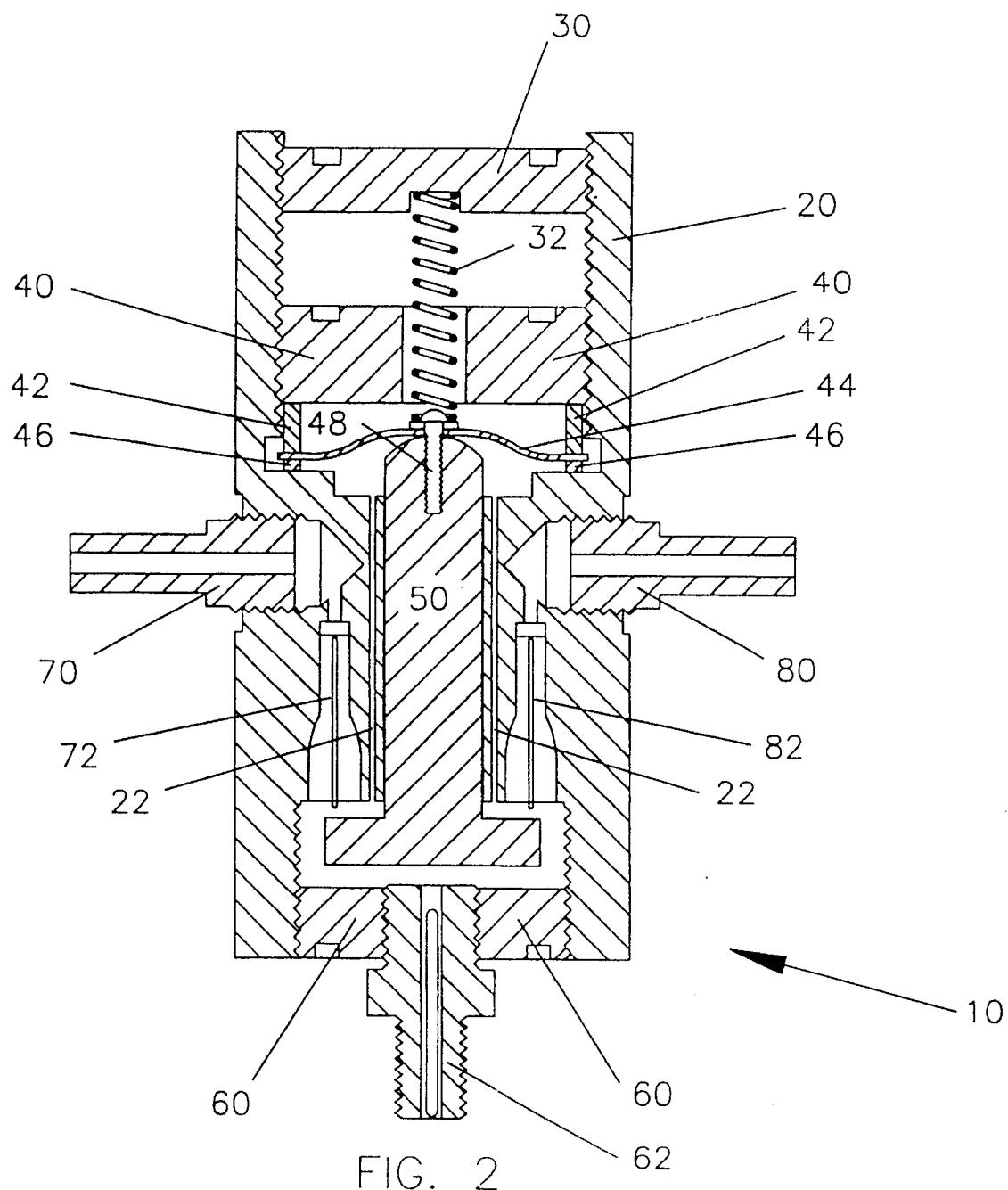
FIG. 2 is a cross section view of the preferred embodiment with the valves closed.

The figures are able to show the present invention with fidelity using cross sections because the present invention inherently has obvious symmetries. FIG. 1 and FIG. 2 show the two states of the preferred embodiment of equalizer 10. Body 20 is a machined or molded cylinder of impermeable material. Both plastic and metal have been used successfully to make body 20. The upper and lower portion of body 20 is inside threaded.

The arrangement and cooperation of the parts may best be appreciated by describing the assembly of the parts into body 20. Ports to communicate with the associated tires are distributed around the perimeter of body 20. First-port 70 and second-port 80 are shown on the figures, but additional ports could be used. First-port 70 and second-port 80 are threaded into body 20 and are intended to be surrounded by a clamped hose communicating with the associated tires. The present invention encompasses the numerous ways that the ports could be effected. Important to the present invention is the placement of conventional tire valves in series with the port. First-valve 72 and second-valve 82 are shown in series respectively with first-port 70 and second-port 80. The valves used are those inexpensive valves commonly used in tires. The valves are also placed so that the actuator stems of the valves may touch the piston 50 and will cause the valves to be open when the piston pushes in on the stems. The body also contains one or more conduits 22 that communicate from the volume near the top of piston 50 to the volume near the bottom of piston 50 so as to insure that the pressures in those two volumes are essentially the same without having to rely on air communicating around piston 50.

Referring to FIG. 1 and FIG. 2, FIG. 1 shows the valves, 72 and 82, pushed up into their open position by the piston, 50. In FIG. 2, the piston, 50, has dropped down (because the air pressure against the diaphragm, 44, has dropped below its adjustable, threshold level) thus allowing the valves, 72 and 82 to close. As long as the air pressure pushing on the diaphragm, 44, remains above the adjustable, threshold level, the piston, 50, will remain in the position as illustrated in FIG. 1, thus holding the valves, 72 and 82 open and allowing air to flow between the ports, 70 and 80.

Diaphragm-seat 46 is dropped into the top of body 20 and followed by diaphragm 44. Diaphragm 44 has successfully been made of sheet plastic, but could be made of other impervious flexible materials. Piston 50 is fitted up from the bottom and attached to diaphragm 44 with screw 48. Diaphragm-sleeve 42 is dropped into the top and followed by threaded diaphragm-plug 40, which is tightened to hold diaphragm 44 in place. Spring 32 is dropped through the central orifice in diaphragm-plug 40 and placed over the head of screw 48. Spring-plug 30 is screwed into the top with the end of spring 32 held captive in a central under recess in spring-plug 30. Spring 32 imposes a force on piston 50 (against the force produced by the pressure difference between inside and outside the chamber across diaphragm 44) biasing the position of piston 50. In due course, the threshold pressure is adjusted by varying how much spring-plug 30 is screwed in to set the compression of spring 32.

The assembly of equalizer 10 is completed by screwing in inlet-plug 60 with inlet-port 62. The system including the associated tires is pressurized through inlet-port 62. After the system is pressurized, air must be prevented from escaping through inlet-port 62. The escape of air through inlet-port 62 may be prevented by placing a suitable valve or flow disconnector in series with inlet-port 62. One might also place a pressure gauge on inlet-port 62 and thereby monitor the pressure in the system. One might also place a pressure gauge so that it monitors the pressure in the system through an additional port.

Figure 3:
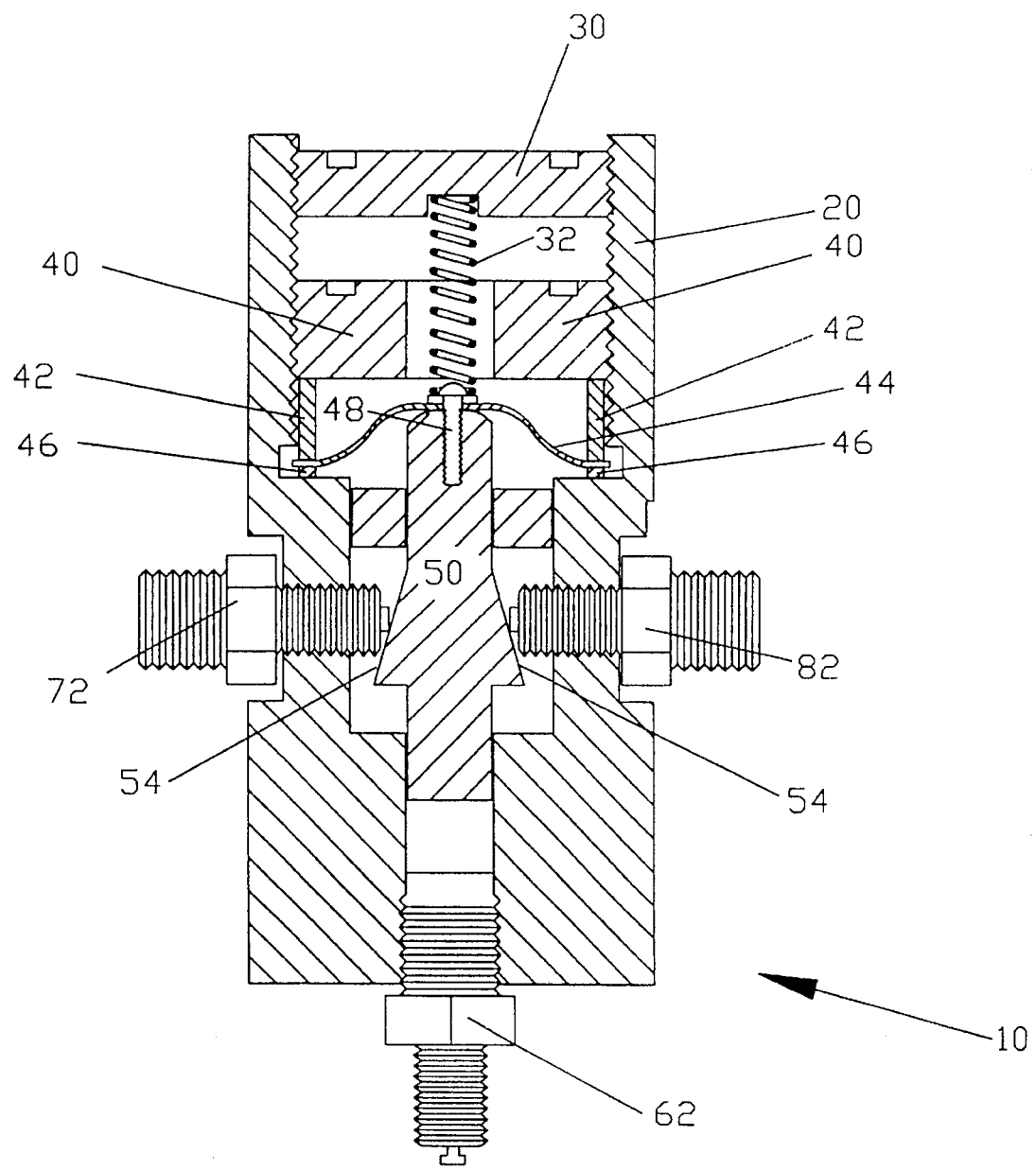
FIG. 3 is a cross section view of an alternative embodiment with the valves open.
Figure 4:
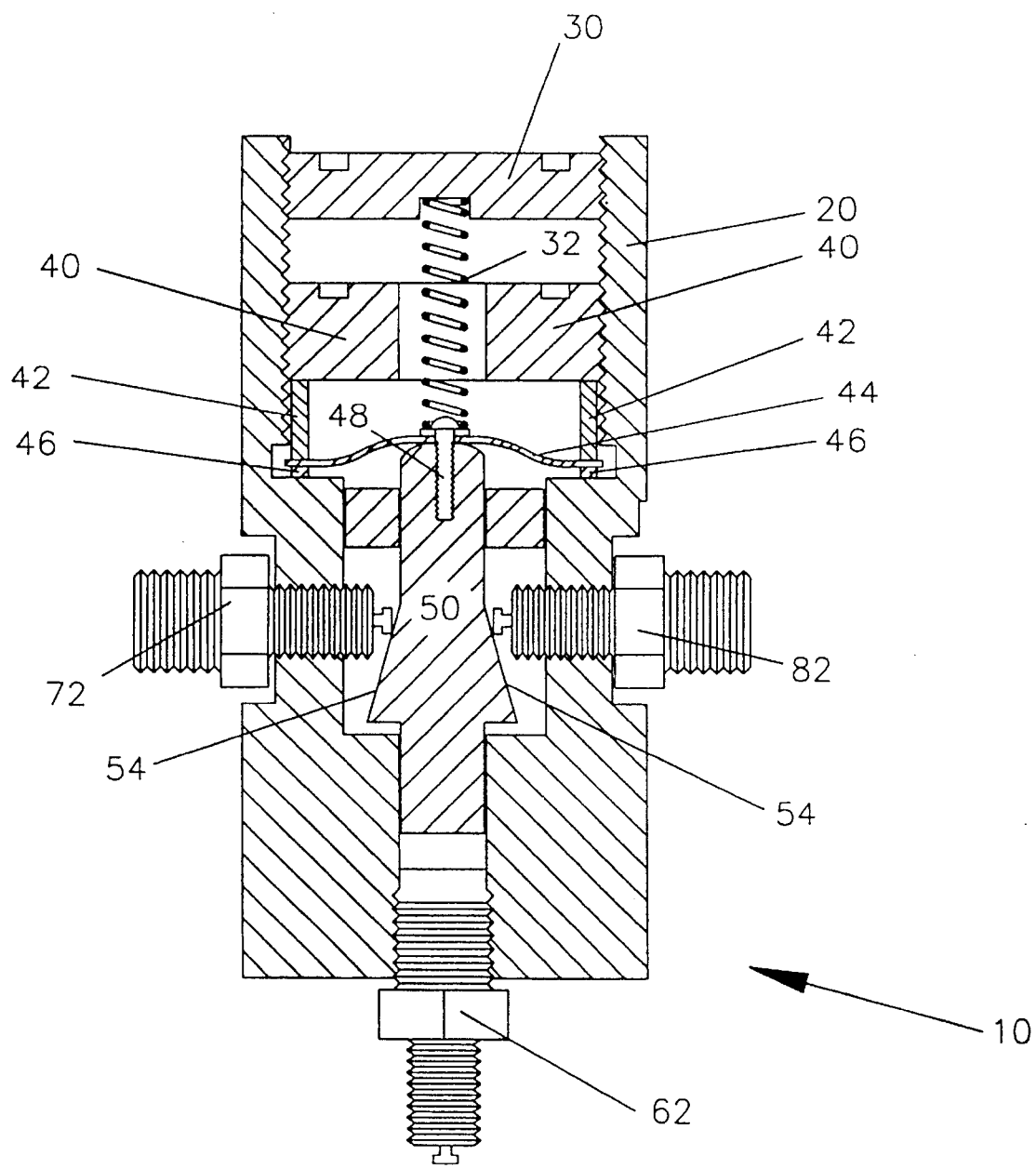
FIG. 4 is a cross section view of an alternative embodiment with the valves closed.

FIG. 3 and FIG. 4 show the two states of the alternate embodiment of equalizer 10. The important aspect of having a pressure sensitive piston actuating valves that are in series with ports communicating with tires is preserved. Much of the two embodiments is the same. The difference lies in that in the alternate embodiment: (1) the valves (first-valve 72 and second-valve 82) are mounted so that their main axes are essentially perpendicular to the major axis of the piston instead of being essentially parallel and (2) the valves are actuated through the camming action of camming-surface 54 on piston 50.

In operation, both the preferred embodiment and the alternate embodiment have body 20 attached to a wheel or axle. A hose (or other conduit) communicates from the internal volume of one tire to first-port 70 and a second hose communicates from a second tire to second-port 80. A pressurizing means, such as a pump, is temporarily attached to inlet-port 62 and used to pressurize both tires at once. In both embodiments, the piston is capable of at least slight movement proportional to the pressure in the chamber and is able to engage and actuate both of the valve actuators such that the first valve and the second valve are open only when the pressure in the chamber is greater than a desired value. Otherwise both valves are closed. Typical piston movement is less than 0.1 inches (2.5 mm).

The preferred embodiment and an alternate embodiment of the present invention have been described in detail. The embodiments described are illustrative and not restrictive.

I claim:

1. A device comprising:

a body including a pressurizable chamber, a first port that communicates with a first tire, and a second port that communicates with a second tire;

a first valve having an actuator extending toward said chamber and placed between said chamber and said first port;

a second valve having an actuator extending toward said chamber and placed between said chamber and said second port;

means for applying a force to actuate said first valve's actuator and said second valve's actuator, such that substantially all of the force applied by said means is in a direction parallel to the long axis of said actuators of said valves, and such that said first valve and said second valve are open only when the pressure in said chamber is greater than a desired value and are otherwise closed.

2. The device of claim 1 wherein said body further includes a third port communicating with said chamber for pressurizing said chamber.

3. The device of claim 2 further including sensor means for measuring the pressure in said chamber.

4. The device of claim 1 wherein said first valve and said second valve are schrader type valves.

5. The device of claim 1 wherein said means for applying a force is a piston capable of at least slight movement proportional to the pressure in said chamber such that said first valve's actuator and said second valve's actuator move in a direction essentially parallel to the movement direction of said piston.

6. A device comprising:

a body including a pressurizable chamber, a first port that communicates with a first tire, a second port that communicates with a second tire, pressure responsive means for converting pressure in said chamber to motion, and means cooperative with said converting means for applying a force such that substantially all of the force applied by said cooperative means is in a direction parallel to the long axis of said actuators of said valves where said cooperative means moves proportionally to the pressure in said chamber;

a first valve having an actuator extending toward said chamber and placed between said chamber and said first port;

a second valve having an actuator extending toward said chamber and placed between said chamber and said second port; and said cooperative means able directly to actuate said first valve's actuator and said second valve's actuator such that said first valve and said second valve are open only when the pressure in said chamber is greater than a desired value and are otherwise closed.

7. The device of claim 6 wherein said body further includes a third port communicating with said chamber for pressurizing said chamber.

8. The device of claim 7 further including sensor means for measuring the pressure in said chamber.

9. The device of claim 6 wherein said first valve and said second valve are schrader type valves.

10. The device of claim 6 wherein said cooperative means is a slidable piston attached to said pressure responsive means such that said first valve's actuator and said second valve's actuator move in a direction essentially parallel to the movement direction of said piston.

11. The device of claim 6 wherein said pressure responsive means comprises:

an impervious flexible diaphragm on the periphery of said chamber and attached to said piston such that the force produced by the pressure difference between inside and outside the chamber across said diaphragm acts on said piston; and force producing means bearing axially on said piston for biasing the position of said piston.

12. The device of claim 11 wherein said force producing means is a spring.

13. A device comprising:

a body including a pressurizable chamber, a first port that communicates with a first tire, a second port that communicates with a second tire, pressure responsive means for converting pressure in said chamber to lineal motion, and a slidable piston with first end and second end, said first end attached to said pressure responsive means so that said piston moves proportionally to the pressure in said chamber in such a way that said piston applies a force between said second end and first and second valves where said force is in a direction which is substantially parallel to the long axis of an actuator in said first valve and to an actuator in said second valve;

said first valve having an actuator extending toward said chamber and placed between said chamber and said second port; and said second valve having an actuator extending toward said chamber and placed between said chamber and said second port; and said piston's second end able directly to engage and actuate said first valve's actuator and said second valve's actuator such that said first valve and said second valve are open only when the pressure in said chamber is greater than a desired value and are otherwise closed.

14. The device of claim 13 wherein said body further includes a third port communicating with said chamber for pressurizing said chamber.

15. The device of claim 14 further including sensor means for measuring the pressure in said chamber.

16. The device of claim 13 wherein said first valve and said second valve are Schrader type valves.

17. The device of claim 13 wherein said first valve's actuator and said second valve's actuator move in a direction essentially parallel to the movement direction of said piston.

18. The device of claim 13 wherein said first valve's actuator and said second valve's actuator move in a direction essentially not parallel to the movement direction of said piston and wherein said pistons's second end includes a cam to actuate said first valve's actuator and said second valve's actuator.

19. The device of claim 13 wherein said pressure responsive means comprises:

an impervious flexible diaphragm on the periphery of said chamber and attached to said piston such that the force produced by the pressure difference between inside and outside the chamber across said diaphragm acts on said piston; and force producing means bearing axially on said piston for biasing the position of said piston.

20. The device of claim 19 wherein said force producing means is an adjustable spring.

\* \* \* \* \*